US010259285B2

(12) United States Patent
Kuroda et al.

(10) Patent No.: US 10,259,285 B2
(45) Date of Patent: Apr. 16, 2019

(54) STABILIZER MANUFACTURING APPARATUS AND STABILIZER MANUFACTURING METHOD

(71) Applicant: NHK SPRING CO., LTD., Yokohama, Kanagawa (JP)

(72) Inventors: Shigeru Kuroda, Kanagawa (JP); Hiroaki Suzuki, Kanagawa (JP)

(73) Assignee: NHK SPRING CO., LTD., Yokohama, Kanagawa (JP)

( * ) Notice: Subject to any disclaimer, the term of this patent is extended or adjusted under 35 U.S.C. 154(b) by 0 days.

(21) Appl. No.: 15/327,587

(22) PCT Filed: Jul. 17, 2015

(86) PCT No.: PCT/JP2015/070570
§ 371 (c)(1),
(2) Date: Jan. 19, 2017

(87) PCT Pub. No.: WO2016/013519
PCT Pub. Date: Jan. 28, 2016

(65) Prior Publication Data
US 2017/0174036 A1     Jun. 22, 2017

(30) Foreign Application Priority Data
Jul. 23, 2014    (JP) ................................ 2014-149556

(51) Int. Cl.
*B60G 21/055*      (2006.01)
*F16F 1/36*           (2006.01)
(Continued)

(52) U.S. Cl.
CPC ............ *B60G 21/055* (2013.01); *B29C 65/10* (2013.01); *B29C 65/44* (2013.01); *B29C 65/48* (2013.01);
(Continued)

(58) Field of Classification Search
CPC .... B60G 21/055; B60G 21/05; B60G 21/026; B60G 21/04; F16F 1/36
See application file for complete search history.

(56) References Cited

U.S. PATENT DOCUMENTS 3,677,809 A * 7/1972 Klement .................... C08J 5/06
                                                       156/333
4,122,321 A    10/1978 Cachat
(Continued)

FOREIGN PATENT DOCUMENTS

CN         103231637 A      8/2013
CN         103317994 A      9/2013
(Continued)

OTHER PUBLICATIONS

International Search Report for PCT/JP2015/070570, dated Sep. 8, 2015.
(Continued)

*Primary Examiner* — Darlene P Condra
(74) *Attorney, Agent, or Firm* — Merchant & Gould P.C.

(57) ABSTRACT

A stabilizer manufacturing apparatus is adapted to bond a rubber bush, which is a bush made of rubber disposed between a stabilizer and a vehicle body, to a rubber bush bonding location where an adhesive layer of the stabilizer is formed. The stabilizer manufacturing apparatus is provided with: a curing furnace for heating the stabilizer, which is conveyed by a manufacturing line conveying unit and has the rubber bush bonding location with which the rubber bush is press-contacted, and performing the bonding; a heat source device that heats air; a blower device that sends the air heated by the heat source device as hot air; and a plurality of nozzles that are disposed along the manufacturing line conveying unit in the curing furnace and blow the hot air
(Continued)

against, at a near position from, a location in the vicinity of the rubber bush bonding location of the stabilizer.

12 Claims, 12 Drawing Sheets

(51) Int. Cl.
| | |
|---|---|
| B60G 21/02 | (2006.01) |
| B60G 21/04 | (2006.01) |
| B60G 21/05 | (2006.01) |
| B29C 65/10 | (2006.01) |
| B29C 65/44 | (2006.01) |
| B29C 65/48 | (2006.01) |
| B29C 65/78 | (2006.01) |
| B29C 65/00 | (2006.01) |
| B29L 31/00 | (2006.01) |
| B29L 31/30 | (2006.01) |

(52) U.S. Cl.
CPC ........ *B29C 65/787* (2013.01); *B29C 66/1122* (2013.01); *B29C 66/53241* (2013.01); *B29C 66/71* (2013.01); *B29C 66/742* (2013.01); *B29C 66/80* (2013.01); *B29C 66/836* (2013.01); *B29C 66/8432* (2013.01); *B29C 66/9141* (2013.01); *B29C 66/9161* (2013.01); *B29C 66/91951* (2013.01); *B60G 21/026* (2013.01); *B60G 21/04* (2013.01); *B60G 21/05* (2013.01); *B60G 21/0551* (2013.01); *F16F 1/36* (2013.01); *B29C 65/483* (2013.01); *B29L 2031/30* (2013.01); *B29L 2031/721* (2013.01); *B60G 2204/1222* (2013.01); *B60G 2206/8106* (2013.01); *B60G 2206/821* (2013.01)

(56) References Cited

U.S. PATENT DOCUMENTS

| | | | | |
|---|---|---|---|---|
| 4,761,894 A * | 8/1988 | Hamasaki | ............... | F26B 3/305 |
| | | | | 118/58 |
| 4,781,054 A | 11/1988 | Brown et al. | | |
| 8,419,033 B2 * | 4/2013 | Kuroda | ............. | B29C 45/14221 |
| | | | | 280/124.164 |
| 8,613,460 B2 | 12/2013 | Suwa et al. | | |
| 2006/0091595 A1 * | 5/2006 | Hayashi | ............. | B60G 21/0551 |
| | | | | 267/276 |
| 2009/0071945 A1 * | 3/2009 | Terada | ................. | B23K 1/0056 |
| | | | | 219/121.63 |
| 2011/0259873 A1 * | 10/2011 | Misumi | ................. | F26B 21/086 |
| | | | | 219/494 |
| 2012/0318409 A1 * | 12/2012 | Mizuno | ................ | B60G 21/055 |
| | | | | 148/506 |
| 2013/0118649 A1 | 5/2013 | Hirata et al. | | |
| 2015/0255780 A1 * | 9/2015 | Tsuchiya | ................ | F26L 313/10 |
| | | | | 427/58 |
| 2016/0257178 A1 * | 9/2016 | Higuchi | .................. | F16F 15/08 |
| 2017/0282447 A1 * | 10/2017 | Suzuki | ............... | B29C 65/4835 |

FOREIGN PATENT DOCUMENTS

| | | |
|---|---|---|
| DE | 102011112077 A1 | 3/2013 |
| EP | 2392449 A2 | 12/2011 |
| JP | S58-125613 U | 8/1983 |
| JP | S60-131243 A | 7/1985 |
| JP | H04-223911 A | 8/1992 |
| JP | H04-224619 A | 8/1992 |
| JP | 2000-177009 A | 6/2000 |
| JP | 2001-270315 A | 10/2001 |
| JP | 2006-027311 A | 2/2006 |
| JP | 2006-170293 A | 6/2006 |
| JP | 2006-290313 A | 10/2006 |
| JP | 2011-196491 A | 10/2011 |
| JP | 2012-121414 A | 6/2012 |
| JP | 2013-208515 A | 10/2013 |
| JP | 2013-258313 A | 12/2013 |
| WO | 2013/029792 A1 | 3/2013 |

OTHER PUBLICATIONS

Search Report for European Patent Application No. 15824883.1, dated Mar. 7, 2018.
Office Action for Chinese Patent Application No. 201580039783.7, dated May 21, 2018.
Office Action for Japanese Patent Application No. 2014-149556, dated Jun. 12, 2018.

* cited by examiner

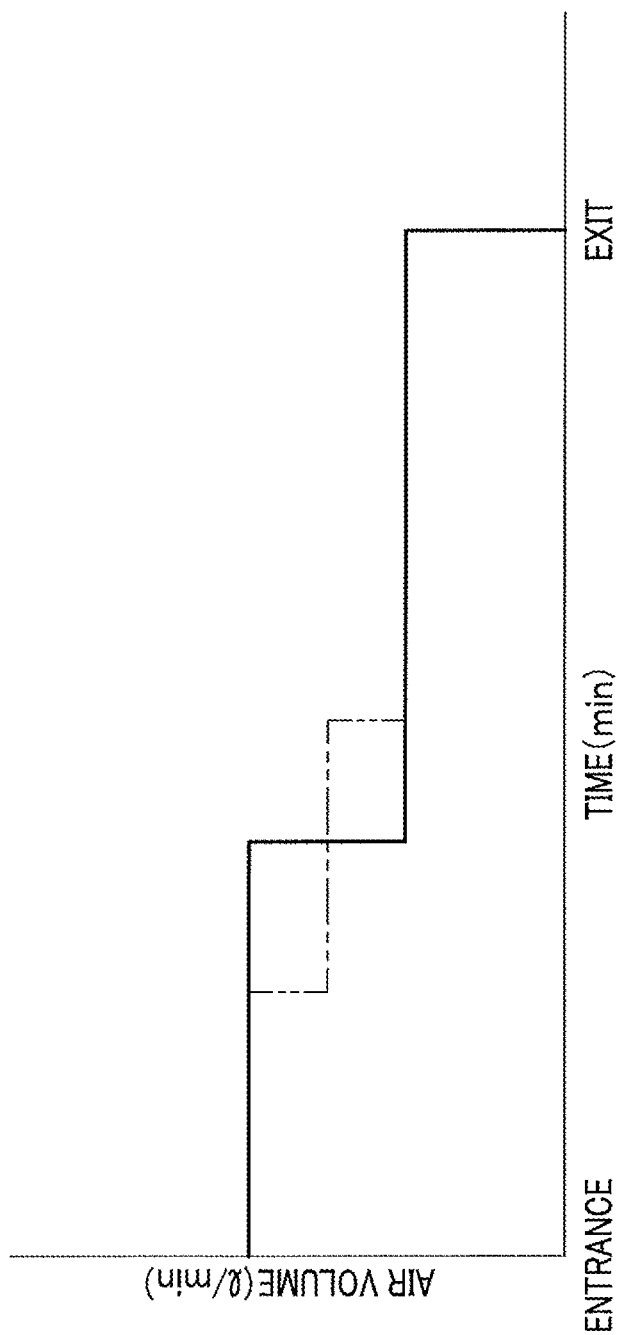

STABILIZER MANUFACTURING APPARATUS AND STABILIZER MANUFACTURING METHOD

CROSS-REFERENCE TO RELATED APPLICATION

This application is a U.S. National Stage Application under 35 U.S.C. § 371 of International Patent Application No. PCT/JP2015/070570 filed Jul. 17, 2015, which claims the benefit of priority to Japanese Patent Application No. 2014-149556 filed Jul. 23, 2014, the disclosures of all of which are hereby incorporated by reference in their entireties. The International Application was published in Japanese on Jan. 28, 2016 as WO 2016/013519.

TECHNICAL FIELD

The present invention relates to a stabilizer manufacturing apparatus and a stabilizer manufacturing method, for fixing a rubber bush used when fixing a stabilizer to a vehicle body, to the stabilizer.

BACKGROUND

A conventional vehicle is equipped with a stabilizer that is used to cancel deviation of up-and-down motions of right and left wheels.

The stabilizer includes arm sections that are connected to a pair of right and left suspensions, respectively, and a stabilizer bar that allows torsional deformation and its restoration to be carried out therein.

The stabilizer bar is provided to allow a central region thereof to be rotatable with respect to a vehicle body through a rubber bush.

The rubber bush is a buffer that absorbs and reduces impact, vibration and the like exerted on the right and left wheels. The rubber bush is firmly attached to a bracket, and the bracket is fixed to the vehicle body using bolts.

In a case where the rubber bush is attached to the stabilizer bar, conventionally, the rubber bush has not been firmly attached to the stabilizer bar, but has been only inserted around the central region of the stabilizer bar.

That is, the stabilizer bar has been configured to be axially movable and rotatable with respect to the rubber bush that is fixed to the vehicle body.

CITATION LIST

Patent Literature

Patent Literature 1: Japanese Unexamined Patent Application Publication No. 2006-27311
Patent Literature 2: Japanese Unexamined Patent Application Publication No. 2012-121414

SUMMARY OF THE INVENTION

Technical Problem

The stabilizer bar and the rubber bush are movable as described above, and thus there exists a gap, i.e., clearance, between both members. As a result, there exists a variation in surface pressure between the stabilizer bar and the rubber bush.

Moreover, there is a possibility that sand and/or mud enter the gap between the stabilizer bar and the rubber bush to allow a coated film formed on the surface of the stabilizer bar to be eroded, and to allow abrasion of the stabilizer bar to progress.

Furthermore, when water enters the gap between the stabilizer bar and the rubber bush, or an ambient temperature becomes extremely low, a problem occurs in that the rubber bush slips on the stabilizer bar to allow abnormal noise to be generated.

In addition, when the vehicle turns, there is a possibility that the stabilizer bar and the rubber bush fixed to the vehicle body are displaced from each other, and thus steering responsiveness is far from being good. To cope with this, a displacement stopper (not shown) made of aluminum is provided in the vicinity of the rubber bush. In this case, a weight of the vehicle is increased by the displacement stopper, which goes against a current trend for an improvement of fuel efficiency.

In order to solve such problems, in recent years, a stabilizer bar to which a rubber bush is firmly attached with an adhesive has been developed, and patent literatures relating to such a stabilizer bar are disclosed (for example, see Patent Literatures 1 and 2).

However, when bonding the rubber bush to the stabilizer bar, heat-bonding needs to be carried out for about half an hour at around 160 degrees Celsius in a continuous heating furnace.

When the heat-bonding is carried out in the furnace, the entire inside of the furnace needs to be heated at the temperature of at least around 160 degrees Celsius.

FIG. 13 describes a graph representing transition of a temperature in a furnace in a situation of bonding of a rubber bush to a stabilizer bar in a conventional art. The horizontal axis in FIG. 13 represents the amount of time (min: minutes), and the vertical axis in FIG. 13 represents the furnace temperature.

As is obvious from FIG. 13, problems occur in that a rise of the furnace temperature is slow and thermal energy generated after the stabilizer bar is heated at around 160 degrees Celsius goes to waste.

In addition, since the entire stabilizer bar is heated, there is a possibility that extra thermal energy is consumed to lead to an increase in cost.

Incidentally, in the case of such a continuous heating furnace using radiation heat and eradiation heat, a heat source is set to have a higher temperature than a set temperature in the furnace which is a set temperature at a time of bonding of an object, because of heat loss due to heat transfer by air and the like.

Moreover, in order to allow the object to rise up to the set temperature as rapidly as possible from room temperature when the object enters the furnace, the set temperature of the heat source is set, in some cases, to be even higher in the vicinity of an entrance of the furnace as indicated by a two-dot chain line in FIG. 5. From the above, there is a high possibility that extra thermal energy is further consumed.

In view of the above actual situation, the present invention makes it an object thereof to provide a stabilizer manufacturing apparatus and a stabilizer manufacturing method that are capable of heat-bonding a rubber bush to a stabilizer at a low cost and with space saved.

Solution to Problem

In order to solve the problems described above, this disclosure is directed to an apparatus and method of stabilizer manufacturing. In some embodiments, and by non-limiting example, a stabilizer manufacturing apparatus that is adapted to bond a rubber bush which is a bush made of rubber interposed between a vehicle body and a stabilizer that suppresses a rolling phenomenon of a vehicle, to a rubber bush bonding location where an adhesive layer of the stabilizer is formed, the stabilizer manufacturing apparatus including: a curing furnace for heating the stabilizer that is conveyed by a manufacturing line conveying unit and has the rubber bush bonding location with which the rubber bush is press-contacted, to perform the bonding; a heat source device that heats air; a blower device that sends the air heated by the heat source device as hot air; and a plurality of nozzles that are disposed along the manufacturing line conveying unit in the curing furnace and adapted to blow the hot air at a near position from and against a location in the vicinity of the rubber bush bonding location of the stabilizer is provided.

One aspect is a stabilizer manufacturing method that realizes the stabilizer manufacturing apparatus according to claim 1.

In another aspect, heat is allowed to be given by heat transfer from the vicinity of the rubber bush bonding location to the rubber bush bonding location, thus making it possible to reduce heat loss and achieve energy saving. In addition, a space required for heating the rubber bush bonding location is very small.

A further aspect is a stabilizer manufacturing apparatus, wherein the nozzles each have a head that has a slant formed to be away from the stabilizer, from a side close to the rubber bush toward a side distant from the rubber bush, in a situation of the hot air being blown against the location.

Yet another aspect is a stabilizer manufacturing method that realizes the stabilizer manufacturing apparatus.

Another aspect is each head of the nozzles is allowed to have the slant formed to be away from the stabilizer, from the side close to the rubber bush toward the side distant from the rubber bush, in a situation of the hot air being blown against the location, thus allowing less hot air to hit the rubber bush and more hot air to hit the stabilizer. Therefore, deterioration of the rubber bush due to heat can be suppressed. Moreover, more heat is given to the stabilizer having high thermal conductivity than the rubber bush having low thermal conductivity, thus making it possible to efficiently and effectively carry out heating of the rubber bush bonding location of the stabilizer, through thermal conduction by the stabilizer having high thermal conductivity. Energy saving can be achieved on this point, too.

Yet another aspect is a stabilizer manufacturing apparatus, wherein the nozzles each have an opening that is disposed to face the stabilizer close to the rubber bush, in a situation of the hot air being blown out through the opening of each nozzle.

Another aspect is the openings of the nozzles are allowed to be disposed to face the stabilizer close to the rubber bush, thus making it possible to avoid the hot air blown out through the openings of the nozzles from directly hitting the rubber bush and to suppress deterioration of the rubber bush as minimally as possible.

Yet another aspect is a stabilizer manufacturing apparatus and method of realizing the same, further including a reflective member that is disposed at a position on the opposite side of the nozzles to face the location in the vicinity of the rubber bush bonding location of the stabilizer, and reflects the hot air blown out through the nozzles to blow the hot air against the location close to the rubber bush on the stabilizer.

Another aspect is the reflective member is allowed to be disposed to reflect the hot air blown out through the nozzles to blow the hot air against the location close to the rubber bush on the stabilizer, thus allowing the nozzles to be only needed on one side and making it possible to effectively utilize heat of the hot air blown out through the nozzles.

Therefore, the manufacturing cost and running cost can be reduced and thus a decrease in cost can be achieved. Moreover, the nozzles are only needed on one side and the heat of the hot air blown out through the nozzles can be effectively utilized, thus making it possible to reduce energy consumption.

Yet another aspect is a stabilizer manufacturing apparatus, wherein the reflective member has a concave shape which is concave to the location in the vicinity of the rubber bush bonding location of the stabilizer.

A further aspect is a reflective member is allowed to have a concave shape which is concave to the location in the vicinity of the rubber bush bonding location of the stabilizer, thus making it possible to reflect the hot air blown out through the nozzles to blow the hot air with being effectively collected at and against the location in the vicinity of the rubber bush bonding location of the stabilizer.

Accordingly, thermal energy can be effectively transferred to the rubber bush bonding location of the stabilizer to heat the rubber bush bonding location and thus the energy can be effectively used.

Another aspect is a stabilizer manufacturing apparatus and method realizing the same, further including a fixing jig that fixes the stabilizer to the manufacturing line conveying unit, wherein the reflective member is attached to the fixing jig.

Yet another aspect is a reflective member allowed to be attached to the fixing jig, thus allowing the reflective member to need only to have the smallest volume and an attachment structure of the reflective member to be simplified. Therefore, a decrease in cost can be achieved.

A further aspect is a stabilizer manufacturing apparatus and method that realizes the same, wherein the stabilizer with which the rubber bush is press-contacted is conveyed by the manufacturing line conveying unit from an entrance to an exit of the curing furnace, and air volume of hot air blown out through the nozzles disposed on the entrance side of the curing furnace is set to be more than air volume of hot air blown out through the nozzles disposed on the exit side.

Another aspect is the air volume of hot air blown out through the nozzles is allowed to be set to be more on the entrance side of the curing furnace than on the exit side, thus making it possible to prevent the air volume from being used in vain, reduce the energy and achieve energy saving.

Yet another aspect is a stabilizer manufacturing apparatus, wherein a temperature at which the heat source device heats air is set to be a constant temperature.

A further aspect is a temperature at which the heat source device heats air is allowed to be set to be a constant temperature, thus making it possible to reduce the configuration for controlling the temperature to decrease the manufacturing cost with a low failure rate, and to reduce maintenance work to increase reliability.

Advantageous Effects of the Invention

The present invention makes it possible to materialize a stabilizer manufacturing apparatus and a stabilizer manufacturing method that are capable of heat-bonding a rubber bush to a stabilizer at a low cost and with space saved.

BRIEF DESCRIPTION OF DRAWINGS

FIG. 6 is a graph representing air volume of hot air which is blown against the vicinity of the bonding location of the stabilizer from the entrance to the exit of the curing furnace, for the present invention (solid line) and a conventional art (two-dot chain line).

DESCRIPTION OF EMBODIMENTS

Embodiments of the present invention will be hereinafter described in detail with reference to the drawings as appropriate.

«Embodiments»

Figure 1:
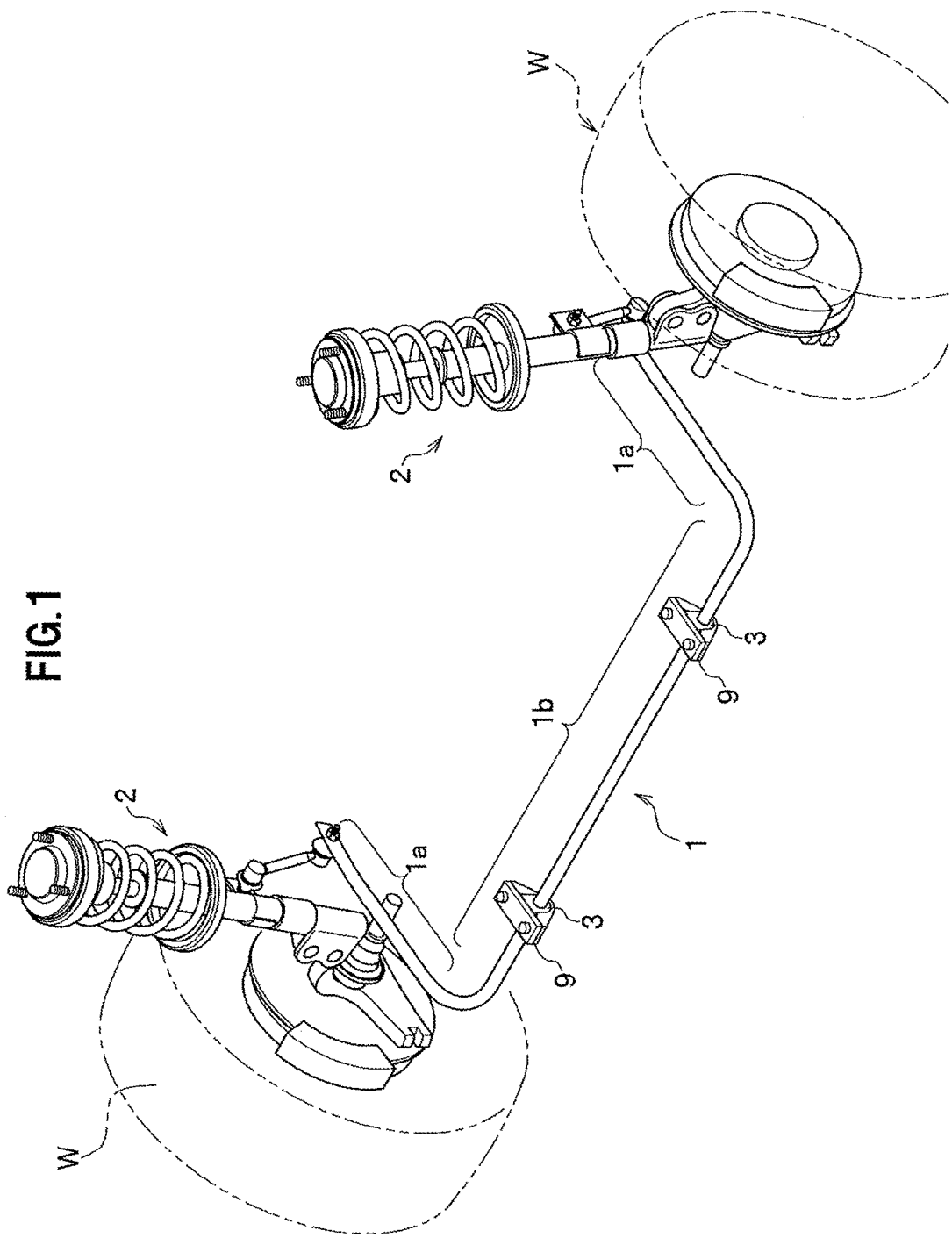
FIG. 1 is a perspective view of the vicinity of a stabilizer according to an embodiment of the present invention.

FIG. 1 describes a perspective view of the vicinity of a stabilizer according to an embodiment of the present invention.

The embodiment describes a stabilizer 1 that is used to cancel deviation of positions of right and left wheels W of a vehicle (not shown).

The vehicle is equipped with a pair of suspension mechanisms 2 attached to the right and left wheels W, and the stabilizer 1 to which the pair of suspension mechanisms 2 is connected.

The stabilizer 1 functions, for example, when the vehicle turns to allow a vehicle body (not shown) to be inclined (rolling phenomenon), to torsionally deform depending on the deviation of positions of the right and left wheels W and generate an elastic force for restoring the torsional deformation to its original state, to thereby suppress the rolling phenomenon of the vehicle.

The stabilizer 1 is formed of, for example, spring steel. Examples of the spring steel that can be used include SUP3, SUP6, SUP7, SUP9, SUP9A, SUP10, SUP11A, SUP12 and SUP13 that are defined in the Japanese Industrial Standards (JIS) G 4801:2005, and SUP10 of these examples is most preferable.

The stabilizer 1 includes right and left arm sections 1a that are connected to the pair of right and left suspension mechanisms 2, respectively, and a stabilizer bar 1b that allows the torsional deformation and its restoration to be carried out therein, and is formed into nearly U shape.

A pair of rubber bushes 3 which are bushes made of rubber is bonded to a central part of the stabilizer bar 1b, with being spaced each other. The rubber bush 3 is a buffer that absorbs and reduces impact, vibration and the like exerted on the right and left wheels. The rubber bush 3 is firmly attached to a bracket 9 using bolts, and the bracket 9 is fixed to the vehicle body using bolts.

The stabilizer 1 to which the rubber bushes 3 are fixed by bonding is manufactured as described below.

First, the stabilizer 1 is formed into a predetermined final shape (see FIG. 1) using pipe material or rod material composed of spring steel as the material. Subsequently, coating is applied on the surface of the material of the final shape of the stabilizer 1. Then, a coated film composed of an epoxy resin-based resin layer is formed on a bonding location 1s (see FIG. 4) for the rubber bush 3 of the material of the final shape, a primer layer is formed on the resin layer, and a top coat layer is formed on the primer layer. The resin layer, the primer layer and the top coat layer that are formed on the stabilizer 1 constitute an adhesive layer.

Subsequently, the rubber bushes 3 are each compressed by a jig to be fixed to two bonding locations 1s that are spaced each other on the central part of the stabilizer 1. Then, a curing process is applied in which the rubber bushes 3 with being compressed and deflected by the jigs are introduced into a curing furnace R (see FIG. 2 and FIG. 3) to be heated and cured as described in detail below.

In the curing process, the resin layer on the surface of the material of the stabilizer 1 and the primer layer are joined together by an anchor effect, an intermolecular bond or the like. Also, the primer layer and the top coat layer are joined together by an ion bond. Moreover, the top coat layer on the surface of the material of the stabilizer 1 and the rubber bushes 3 are reliably joined together by vulcanization reaction, allowing the rubber bushes 3 to be bonded to the stabilizer 1.

Next, description will be given of the curing process.

<Curing Process>

In the curing process, as described above, the pair of rubber bushes 3 are compressed by the jig (not shown) to be fixed to the two bonding locations 1s at which the adhesive layer is formed on the central part of the stabilizer 1. Then, heating is continued for about 32 minutes at about 160 degrees Celsius in the curing furnace R, thereby allowing the pair of rubber bushes 3 to be bonded via the adhesive layer to the two bonding locations 1s on the central part of the stabilizer 1, respectively.

Figure 2:
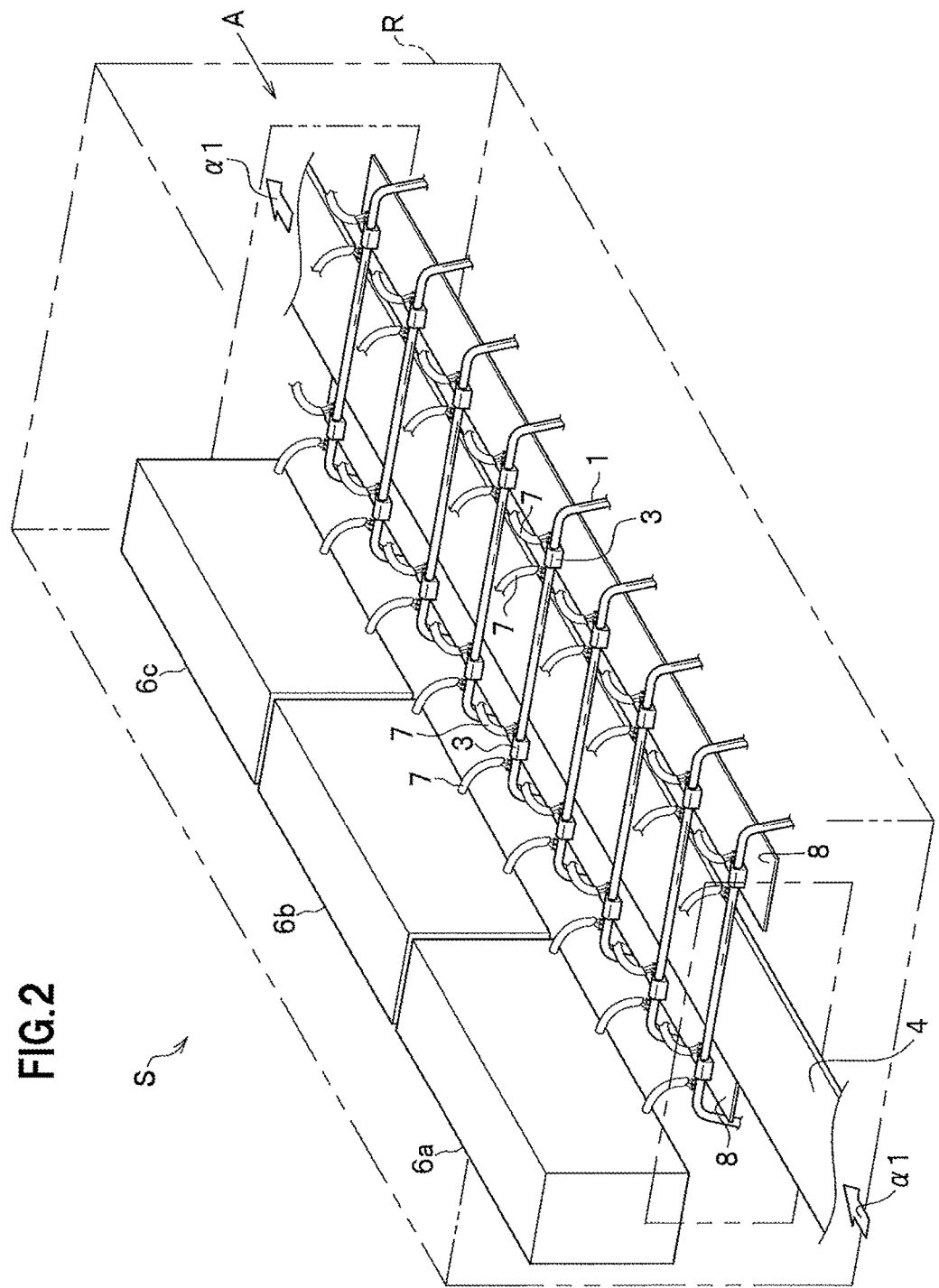
FIG. 2 is a conceptual perspective view showing a state of the stabilizer and a rubber bush in a curing process in a stabilizer manufacturing apparatus according to the embodiment.
Figure 3:
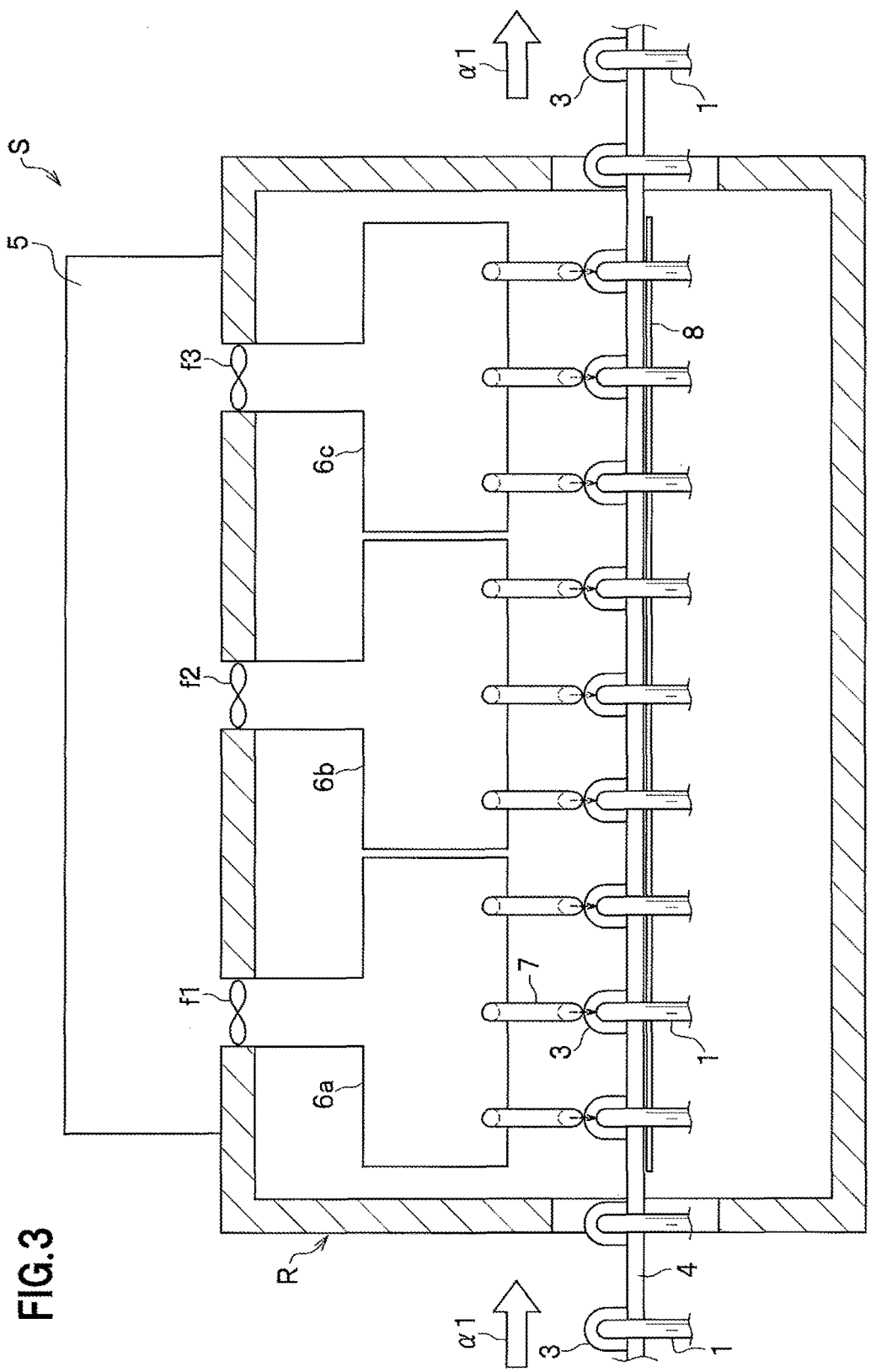
FIG. 3 is a conceptual side view showing a state of the stabilizer and the rubber bush in a furnace in the curing process in the stabilizer manufacturing apparatus according to the embodiment.

FIG. 2 describes a conceptual perspective view showing a state of the stabilizer and the rubber bush in the curing process in a stabilizer manufacturing apparatus according to the embodiment, and FIG. 3 describes a conceptual side view showing a state of the stabilizer and the rubber bush in the furnace in the curing process in the stabilizer manufacturing apparatus according to the embodiment.

Figure 4:
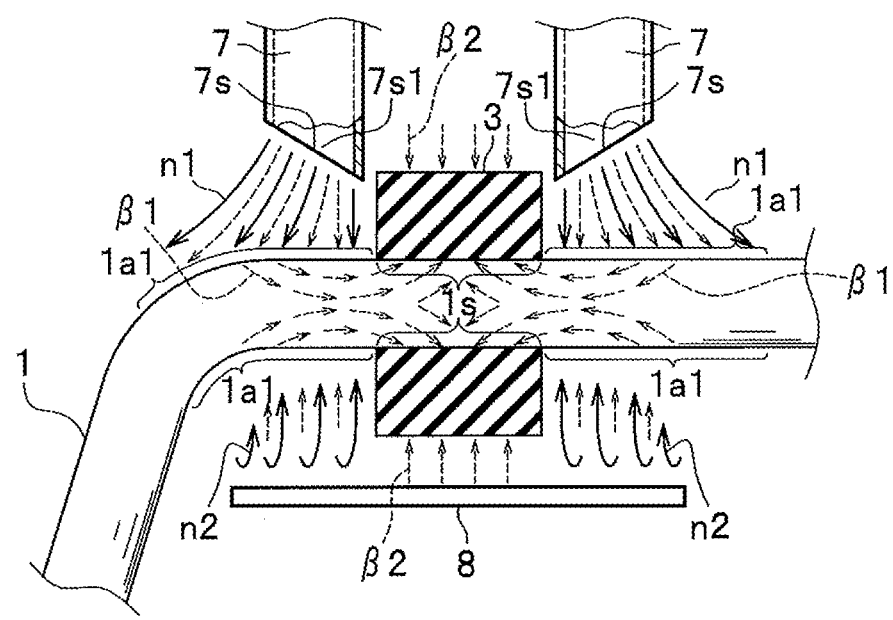
FIG. 4 is a view taken in the direction of arrow A in FIG. 2, showing a state of the vicinity of a bonding location of the stabilizer and the rubber bush 3, the vicinity being heated in the curing furnace.

FIG. 4 describes a view taken in the direction of arrow A in FIG. 2, showing a state of the vicinity of the bonding location of the stabilizer and the rubber bush, the vicinity being heated in the curing furnace.

Note that, in order to facilitate the understanding, FIG. 3 illustrates nozzles 7 each being disposed on one side of one rubber bush 3 of the pair on the stabilizer 1. Moreover, FIG. 3 omits illustration as to nozzles 7 each being disposed on the other side of the one rubber bush 3 and pairs of nozzles 7 each pair being disposed on both sides of the other rubber bush 3 of the pair on the stabilizer 1.

The stabilizer manufacturing apparatus S in the embodiment is provided with the curing furnace R for heating the rubber bush 3 to bond it to the bonding location 1s of the stabilizer 1.

The curing furnace R in which the curing process is carried out is a hot-air type furnace that uses hot air for heating. The curing process in the curing furnace R is controlled by a control unit (not shown), e.g., a PLC (Programmable Logic Controller).

In the curing furnace R, a plurality of stabilizers 1 to which the rubber bushes 3 are compressively fixed by the jigs (not shown) are continuously conveyed on the line (see outlined arrows α1 in FIG. 2 and FIG. 3). More specifically, the pair of rubber bushes 3 are compressed by the jigs (not shown), respectively, to be fixed to (press-contacted with) the two bonding locations 1s on the central part of each of the stabilizers 1 that are mounted on a conveyor belt 4. Then, the stabilizer 1 having the pair of rubber bushes 3 press-contacted therewith is conveyed in the curing furnace R to be heated for about 32 minutes at about 160 degrees Celsius, thereby allowing the bonding to be carried out.

As shown in FIG. 3, provided in the curing furnace R is a hot air generating device 5 that maintains a heat source at a constant temperature and sends hot air. Where the heating is carried out for about 32 minutes at about 160 degrees Celsius, the temperature of the heat source is set to be about 170 (plus 0 to 30) degrees Celsius, i.e., about 170 degrees Celsius to about 200 degrees Celsius. Note that the bonding temperature of about 160 degrees Celsius and the time of about 32 minutes in the heating, and the temperature of the heat source in this case, are merely one example and can be appropriately selected.

The hot air generating device 5 is provided with an air inlet (not shown) for taking in external air, the heat source such as a heater (not shown) that heats the taken-in air at a predetermined temperature, and fans f1, f2, f3 that send the air heated by the heat source to the nozzles 7.

The air taken in through the air intake is heated by the heater (not shown), changed to hot air using the fans f1, f2, f3, and sent through ducts 6a, 6b, 6c to a plurality of nozzles 7. The fans f1, f2, f3 shown in FIG. 3 are schematically illustrated, and the number, locations and the like of the fans f1, f2, f3 can be appropriately set depending on air volume blown out through the respective nozzles 7.

For example, hot air of air volume "High" is supplied by the fan f1 through the duct 6a to the nozzles 7.

Hot air of air volume "Low" is supplied by the fan f2 through the duct 6b to the nozzles 7.

Hot air of air volume "Low" is supplied by the fan f3 through the duct 6c to the nozzles 7.

Then, hot air is blown through an opening 7s1 of a head 7s (FIG. 4) of the nozzle 7, at a near position from and against the location in the vicinity (details are described later) of the bonding location 1s for the rubber bush 3 on the stabilizer 1. The opening 7s1 of the head 7s of the nozzle 7 does not directly face the rubber bush 3, but faces the location in the vicinity of the bonding location 1s for the rubber bush 3. This configuration avoids the hot air blown out through the nozzles 7 from directly hitting the rubber bush 3 and suppresses deterioration of the rubber bush 3 due to heat.

That is, in the curing furnace R, with the temperature of the heat source in the hot air generating device 5 being kept constant, the air volume of hot air allows heat to be given to the location in the vicinity of the bonding location 1s for the rubber bush 3 on the stabilizer 1, and thermal conduction mainly by the stabilizer 1 allows control of the elevated temperature process to be carried out at the bonding location 1s for the rubber bush 3.

As shown in FIG. 4, the nozzles 7 forming hot-air outlets (openings 7s1) are provided at two locations against which the hot air is blown and for one rubber bush 3 that is press-contacted with the stabilizer 1, that is, to constitute a pair of nozzles 7.

The locations against which the hot air is blown, that is, the pair of nozzles 7, are disposed with being spaced each other in place along the conveyor belt 4 (see FIG. 2 and FIG. 3).

Moreover, a reflective plate 8 is provided on the opposite side of the two nozzles 7. The reflective plate 8 is adapted to reflect hot air, which is blown out through the nozzles 7 and passes through neighboring regions 1a1 in the vicinity of the bonding location 1s between the stabilizer 1 and the rubber bush 3, again on the vicinity of the bonding location 1s between the stabilizer 1 and the rubber bush 3.

That is, the hot air n1 blown out through the nozzles 7 and passing through the neighboring regions 1a1 in the vicinity of the bonding location 1s between the stabilizer 1 and the rubber bush 3 hits the reflective plate 8 to be reflected and is directed again to the neighboring regions 1a1 in the vicinity of the bonding location 1s between the stabilizer 1 and the rubber bush 3.

The reflective plate 8 is continuously provided in the direction of movement of the conveyor belt 4 (the direction in which the front and back side of the space in FIG. 4 is penetrated through). Alternatively, a plurality of reflective plates 8 are provided with being spaced each other at least only at areas on which the hot air blown out through the pair of nozzles 7 appropriately provided is reflected as shown in FIG. 4.

The material of the reflective plate 8 can be arbitrarily selected as long as the reflective plate 8 can reflect the hot air blown out through the nozzles 7 on the location (neighboring regions 1a1) in the vicinity of the bonding location 1s for the rubber bush 3 on the stabilizer 1. For example, an iron plate to which rust-proof treatment is applied, e.g., a stainless steel plate, is provided as the reflective plate 8. Note that it is preferable in the light of forming and cost that the stainless steel plate is easy to be formed so as to allow a thickness thereof to be equal to or less than a predetermined thickness.

The head 7s of the nozzle 7, which forms the opening 7s1 that is a hot-air outlet, is formed to allow a side close to the rubber bush 3 to extend to the vicinity of the stabilizer 1 to be made longer, and to allow a side opposite to the rubber bush 3 to be away from the stabilizer 1 to be made shorter, and has a slant shape such that a tube is cut at a slant. That is, the opening 7s1 of the nozzle 7 has an elliptically shaped opening which is obliquely slanted. This allows air volume of the hot air directed to the rubber bush 3 to be lessened.

In addition, orientation of the hot air n1 blown out through the nozzles 7, in other words, the location which the opening 7s1 of the nozzle 7 faces, is allowed to be the location (neighboring regions 1a1) close to the rubber bush 3 on the stabilizer 1, thereby allowing the hot air blown out through the nozzles 7 not to directly hit the rubber bush 3.

This allows air volume of the hot air n1 hitting the rubber bush 3 to be decreased to the extent possible, thermal damage exerted on the rubber bush 3 to be reduced, and thermal deterioration of the rubber bush 3 to be suppressed as minimally as possible.

The hot air n1 which is blown out through the nozzles 7 and hits the neighboring regions 1a1 in the vicinity of the bonding location 1s of the stabilizer 1, or the hot air n1 which passes through the neighboring regions 1a1, is reflected on the reflective plate 8 to be hot air n2, which in turn hits, from below, the neighboring regions 1a1 close to the bonding location 1s for the rubber bush 3 and heats the regions. The heat which heats the region on the stabilizer 1 close to the rubber bush 3 is propagated to the bonding location 1s for the rubber bush 3, through thermal conduction in the stabilizer 1 having high thermal conductivity (see arrows β1 in FIG. 4), and heats the bonding location 1s.

Moreover, the bonding location 1s between the rubber bush 3 and the stabilizer 1 is also heated by heat which is supplied from the external space of the rubber bush 3 (see arrows β2 in FIG. 4) through radiation and air-mediated convection in the curing furnace R.

Herein, since the pair of right and left rubber bushes 3 are provided on the stabilizer 1 (see FIG. 1), four nozzles 7 and two reflective plates 8 are provided for one stabilizer 1 where the bonding locations 1s for the right and left rubber bushes 3 are heated at the same area. Note that a configuration such that the bonding locations 1s for the right and left rubber bushes 3 are heated at different areas may be adopted. FIG. 2 and FIG. 3 illustrate the configuration in which the right and left rubber bushes 3 provided on one stabilizer 1 are heated at the same area.

<Temperature of Heat Source>

Figure 5:
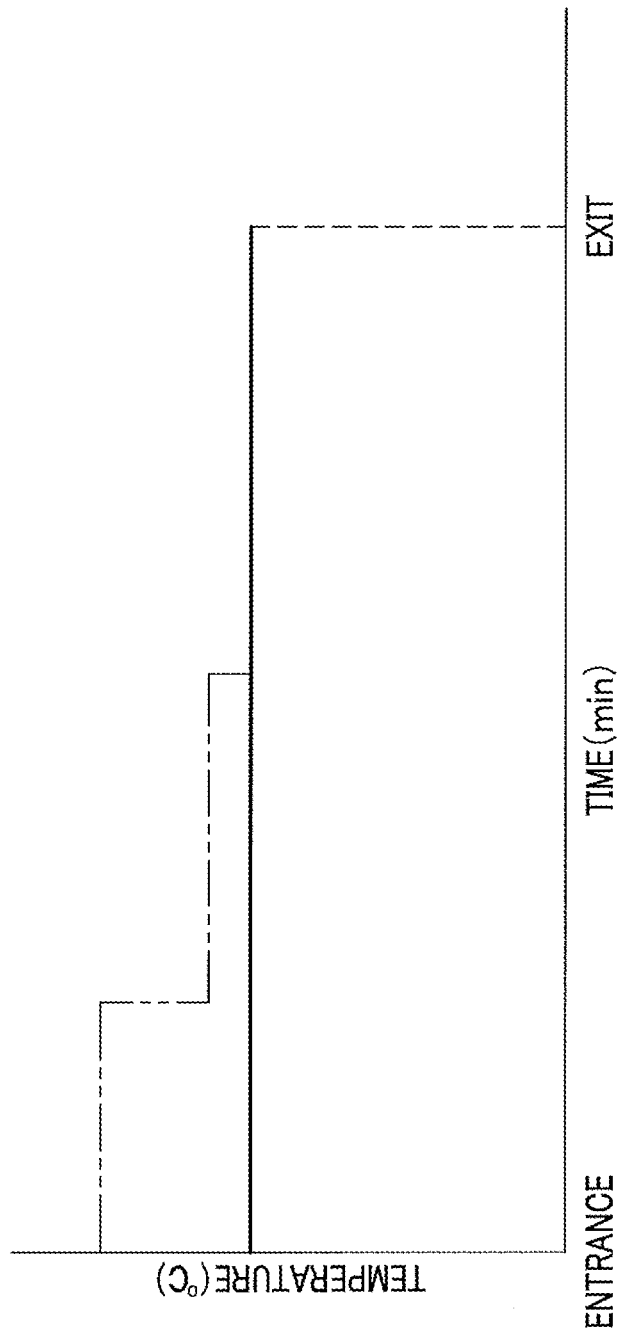
FIG. 5 is a graph representing a temperature of a heat source in a situation of the stabilizer being moved from an entrance to an exit of the curing furnace.

FIG. 5 describes a graph representing a temperature of the heat source in a situation of the stabilizer being moved from an entrance to an exit of the curing furnace. The horizontal axis in FIG. 5 represents the amount of time (elapsed) from the entrance to the exit, and the vertical axis in FIG. 5 represents the temperature of the heat source.

As indicated by a solid line in FIG. 5, the temperature of the heat source is kept at a constant temperature in the process of movement from the entrance to the exit of the curing furnace R, of the stabilizer 1 with which the pair of rubber bushes 3 are press-contacted.

Note that, as long as the heating condition is met for the heating at about 160 degrees Celsius for about 32 minutes at the bonding location 1s for the rubber bush 3 on the stabilizer 1, a configuration may be adopted in which, for the stabilizer 1 with which the rubber bushes 3 are press-contacted, the temperature of the heat source is set to be high in the vicinity of the entrance of the curing furnace R, as indicated by a two-dot chain line, and as the stabilizer 1 approaches the exit, the temperature of the heat source is decreased in two steps or multiple steps. Alternatively, a configuration may be adopted in which the temperature is decreased with at least one of a linear transition of temperature and a curved transition of temperature. Decreasing the temperature makes it possible to achieve energy saving.

<Air Volume Blown Out through Nozzles 7>

FIG. 6 describes a graph representing air volume of hot air which is blown against the vicinity of the bonding location 1s of the stabilizer from the entrance to the exit of the curing furnace, for the present invention (solid line) and a conventional art (two-dot chain line). The horizontal axis in FIG. 6 represents the amount of time (elapsed) from the entrance to the exit, and the vertical axis in FIG. 6 represents transition of the air volume blown out through the nozzles 7.

In the vicinity of the entrance of the curing furnace R, hot air having the maximum air volume is blown against the location in the vicinity of the rubber bush 3 press-contacted with the stabilizer 1 to give a large amount of heat to the location, rapidly increasing the temperature of the bonding location 1s of the stabilizer 1 with which the rubber bush 3 is press-contacted, to around 160 degrees Celsius. Thereafter, the air volume is decreased by one step, allowing the temperature of the bonding location 1s of the stabilizer 1 with which the rubber bush 3 is press-contacted, to be maintained at around 160 degrees Celsius.

That is, the maximum air volume in the vicinity of the entrance of the curing furnace R allows the temperature of the bonding location 1s of the stabilizer 1 with which the rubber bush 3 is press-contacted, to be rapidly increased to around 160 degrees Celsius. Thereafter, the air volume is decreased by one step, allowing the temperature of the bonding location 1s of the stabilizer 1 with which the rubber bush 3 is press-contacted, to be maintained for about 32 minutes at the temperature of about 160 degrees Celsius.

Herein, the temperature of the stabilizer 1 in the vicinity of the rubber bush 3 is measured with a thermocouple. Temperature measurement using the thermocouple may be carried out at a time of production line setting, or at a time of maintenance, or may be carried out in sampling inspection.

Note that, as long as the temperature of the bonding location 1s of the stabilizer 1 with which the rubber bush 3 is press-contacted is maintained at the temperature of about 160 degrees Celsius, a configuration may be adopted in which the air volume is changed in three steps as indicated by a two-dot chain line in FIG. 6, i.e., the temperature of the bonding location 1s of the stabilizer 1 with which the rubber bush 3 is press-contacted is rapidly increased to the temperature of about 160 degrees Celsius in the first step, and then the air volume is decreased in two steps so as to maintain the temperature of about 160 degrees Celsius. Alternatively, as long as the temperature of the bonding location 1s for the rubber bush 3 on the stabilizer 1 is maintained for about 32 minutes at about 160 degrees Celsius, a configuration for decreasing the air volume may adopt another configuration.

The bonding location 1s between the stabilizer 1 and the rubber bush 3 is heated for about 32 minutes at about 160 degrees Celsius in this way, allowing the bonding to be carried out.

The configuration described above allows the openings 7s1 of the nozzles 7 to be disposed so as to allow the hot air to hit the neighboring regions 1a1 (see FIG. 4) in the vicinity of the bonding location 1s for the rubber bush 3 on the stabilizer 1, thereby giving the heat to the bonding location 1s by heat transfer. Therefore, heat loss associated with heat transfer by air-mediated convection and radiation can be greatly reduced, as compared to a conventional continuous heating furnace. Consequently, energy saving can be achieved, which lessens the amount of emission of carbon dioxide and is good for the environment.

Moreover, the air volume of hot air blown out through the nozzles 7 in the vicinity of the entrance of the curing furnace R is set to be higher to allow a large amount of heat to be given, and the air volume of hot air is set to be lower to allow a smaller amount of heat to be given as the stabilizer 1 approaches the exit of the curing furnace R, maintaining the predetermined temperature (about 160 degrees Celsius). This allows the temperature of the bonding location 1s for the rubber bush 3 on the stabilizer 1 with which the rubber bush 3 is press-contacted, to be increased to about 160 degrees Celsius, and then the temperature of about 160 degrees Celsius to be maintained.

Such regulation of the air volume of hot air allows the set temperature of the heat source in the hot air generating device 5 to be constant in principle. This makes a configuration unnecessary, which changes the temperature in the hot air generating device 5, and a minimum number of ducts are only needed, thus making it possible to achieve a decrease in cost.

In addition, as shown in FIG. 6, the air volume in the vicinity of the entrance is made larger with rapid heating from the ambient temperature to allow for quick heating, and from the step of keeping of uniform heating at about 160 degrees Celsius, air volume required for keeping the amount of heat equivalent to radiative cooling is only needed. Therefore, the configuration such that the air volume is decreased in two steps from the initial air volume is basically adopted. However, the number of steps of the air volume may be appropriately changed to three or four steps.

This configuration makes it possible to suppress overheating even in case of trouble such as stagnation within the furnace because the temperature of the heat source in the hot air generating device 5 is kept constant.

Moreover, the configuration such that the hot air is blown from the nozzles 7 against the vicinity of the heating target (the bonding location 1s for the rubber bush 3 on the stabilizer 1) is adopted, thus making it possible to reduce a space required for heating the heating target and achieve space saving. Moreover, increasing or decreasing the air volume blown out through the nozzles 7 makes it possible to carry out regulation such as shortening or lengthening the heating line. For example, when the air volume blown out through the nozzles 7 is increased, the amount of heat to be given to the heating target can be increased to shorten the heating line.

From the above, it is possible to materialize a stabilizer manufacturing apparatus and a stabilizer manufacturing method that are capable of heat-bonding the rubber bushes 3 to the stabilizer 1 at a low cost and with space saved.

«First Modification»

Figure 7A:
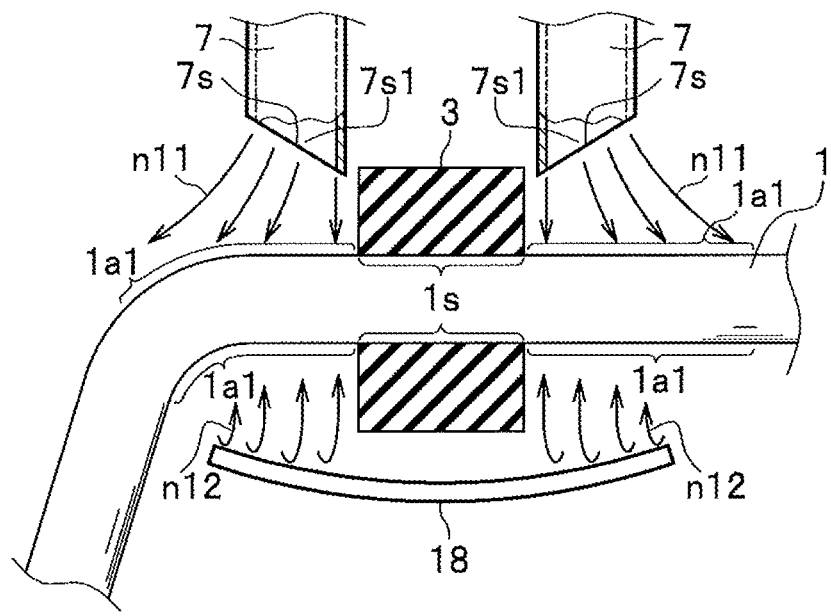
FIG. 7A is a view taken in the direction of arrow A in FIG. 2, showing a state of the bonding being carried out by hot air blown out through nozzles in a first modification.
Figure 7B:
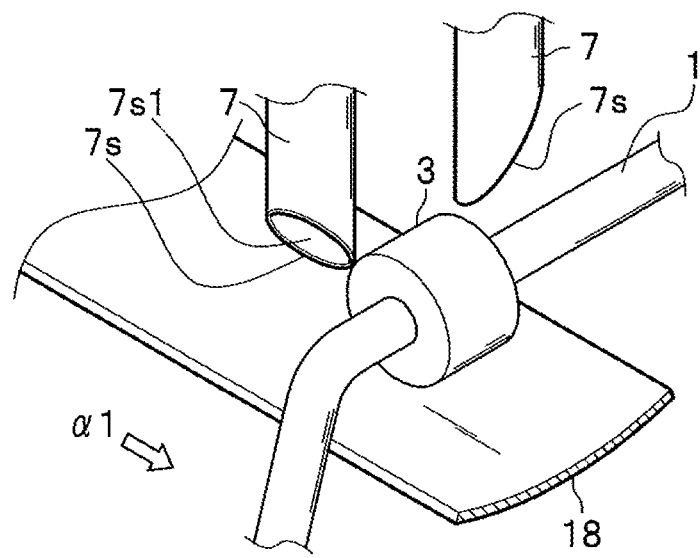
FIG. 7B is a perspective view including partial cross-section, showing the state of the bonding being carried out by hot air blown out through the nozzles in the first modification.

FIG. 7A describes a view taken in the direction of arrow A in FIG. 2, showing a state of the bonding being carried out by hot air blown out through nozzles in a first modification, and FIG. 7B describes a perspective view including partial cross-section, showing the state of the bonding being carried out by hot air blown out through the nozzles in the first modification.

The first modification replaces the reflective plate 8 having the shape of a flat plate in the above embodiment, with a reflective plate 18 having a concave shape.

The other configuration is the same as the configuration of the embodiment, and thus the same component is shown with the same reference sign given and detailed description thereof is omitted.

The reflective plate 18 in the first modification is formed, in order to allow the hot air blown out through the nozzles 7 to be reflected without loss on the location in the vicinity of the bonding location 1s for the rubber bush 3 on the stabilizer 1, into a concave shape with a curvature such that the vicinity (neighboring regions 1a1) of the bonding location 1s and the rubber bush 3 are surrounded inside.

In other words, the reflective plate 18 is formed into a concave shape which is concave to the vicinity (neighboring regions 1a1) of the bonding location 1s and the rubber bush 3.

The reflective plate 18 has a concave shape along the direction in which the stabilizers 1 are placed on the conveyor belt 4 (the direction in which the front and back side of the space in FIG. 7A is penetrated through) (see FIG. 7B).

This allows hot air n11 blown out through the nozzles 7 to hit the neighboring regions 1a1 in the vicinity of the rubber bush 3 on the stabilizer 1 and heat the regions. Then, the hot air n11 passing through the stabilizer 1 is reflected on the reflective plate 18 to be hot air n12, which in turn hits the neighboring regions 1a1 on the side opposite to the nozzles 7 in the vicinity of the rubber bush 3 on the stabilizer 1 and heats the regions.

Note that, as long as the reflective plate 18 is adapted to allow the hot air n11 blown out through the nozzles 7 to be reflected thereon to be the hot air n12, and allow the hot air n12 to hit the neighboring regions 1a1 on the side opposite to the nozzles 7 in the vicinity of the rubber bush 3 on the stabilizer 1, the reflective plate 18 maybe disposed separately for locations facing the nozzles 7, or may be formed into a continuous shape for the locations facing the nozzles 7. Note that FIG. 7B illustrates the case in which the reflective plate 18 is continuously formed.

The first modification allows the reflective plate 18 to have a concave shape, thus allowing the hot air n11 blown out through the nozzles 7 directed to the neighboring regions 1a1 in the vicinity of the rubber bush 3 on the stabilizer 1, to be efficiently reflected toward and hit the neighboring regions 1a1 in the vicinity of the rubber bush 3 on the stabilizer 1. This makes it possible to effectively heat the bonding location 1s. Therefore, the bonding location 1s for the rubber bush 3 on the stabilizer 1 can be heated efficiently and effectively through the thermal conduction by the stabilizer 1, thus reducing energy consumption.

«Second Modification»

Figure 8A:
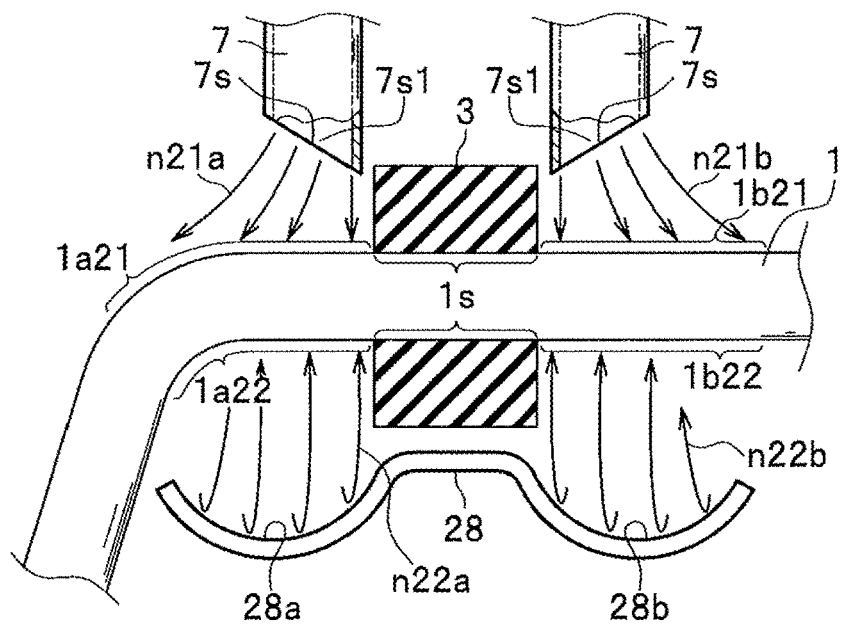
FIG. 8A is a view taken in the direction of arrow A in FIG. 2, showing a state of the bonding being carried out by hot air blown out through nozzles in a second modification.
Figure 8B:
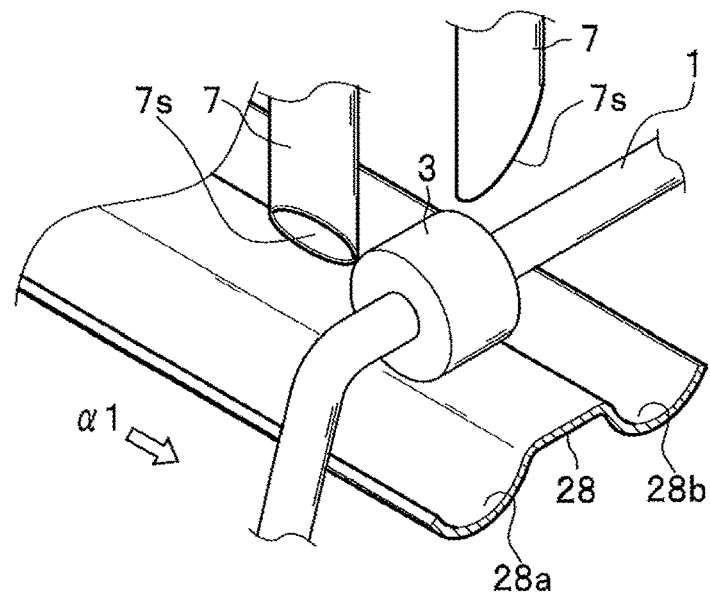
FIG. 8B is a perspective view including partial cross-section, showing the state of the bonding being carried out by hot air blown out through the nozzles in the second modification.

FIG. 8A describes a view taken in the direction of arrow A in FIG. 2, showing a state of the bonding being carried out by hot air blown out through nozzles in a second modification, and FIG. 8B describes a perspective view including partial cross-section, showing the state of the bonding being carried out by hot air blown out through the nozzles in the second modification.

The second modification replaces the reflective plate 8 having the shape of a flat plate in the above embodiment, with a reflective plate 28 having two concave shapes 28a, 28b.

The other configuration is the same as the configuration of the embodiment, and thus the same component is shown with the same reference sign given and detailed description thereof is omitted.

The reflective plate 28 in the second modification is formed, in order to allow the hot air blown out through the nozzles 7 to be reflected without loss on the locations (1a22, 1b22) in the vicinity of the bonding location 1s for the rubber bush 3 on the stabilizer 1, into the two concave shapes 28a, 28b with a curvature such that the vicinity (neighboring regions 1a22, 1b22) of the bonding location 1s of the stabilizer 1 is surrounded inside.

In other words, the reflective plate 28 has the concave shapes 28a, 28b which are concave to the neighboring regions 1a22, 1b22, respectively, in the vicinity of the bonding location 1s of the stabilizer 1.

The reflective plate 28 has the concave shapes extending along the direction in which the stabilizers 1 are placed on the conveyor belt 4 (the direction in which the front and back side of the space in FIG. 8A is penetrated through) (see FIG. 8B).

This allows hot air n21a blown out through one nozzle 7 to hit one neighboring region 1a21 in the vicinity of the rubber bush 3 on the stabilizer 1 and heat the region. Then, the hot air n21a passing through the stabilizer 1 is reflected on the concave shape 28a of the reflective plate 28 to be hot air n22a, which in turn hits one neighboring region 1a22 on the side opposite to the one nozzle 7 in the vicinity of the rubber bush 3 on the stabilizer 1 and heats the region.

In the same way, hot air n21b blown out through the other nozzle 7 hit the other neighboring region 1b21 in the vicinity of the rubber bush 3 on the stabilizer 1 and heat the region. Then, the hot air n21b passing through the stabilizer 1 is reflected on the concave shape 28b of the reflective plate 28 to be hot air n22b, which in turn hits the other neighboring region 1b22 on the side opposite to the other nozzle 7 in the vicinity of the rubber bush 3 on the stabilizer 1 and heats the region.

Note that, as long as the reflective plate 28 is adapted to allow the hot air n21a, n21b blown out through the nozzles 7 to be reflected thereon, and allow the hot air n22a, n22b to hit the neighboring regions 1a22, 1b22 on the side opposite to the nozzles 7 in the vicinity of the rubber bush 3 on the stabilizer 1, the reflective plate 28 may be disposed separately for locations facing the nozzles 7, or may be formed into a continuous shape for the locations facing the nozzles 7. Note that FIG. 8B illustrates the case in which the reflective plate 28 is formed into a continuous shape for the locations facing the nozzles 7.

The second modification allows the reflective plate 28 to have the two concave shapes 28a, 28b. Therefore, the hot air n21a, n21b blown out through the nozzles 7 directed to the neighboring regions 1a21, 1b21 in the vicinity of the rubber bush 3 on the stabilizer 1 can be efficiently reflected, and the reflected hot air n22a, n22b hit the neighboring regions 1a22, 1b22 on the side opposite to the nozzles 7 in the vicinity of the rubber bush 3 on the stabilizer 1, thereby making it possible to effectively heat the bonding location 1s.

In addition, since the reflective plate 28 has the two concave shapes 28a, 28b, it can be easily formed into a shape such that the hot air n21a, n21b blown out through each nozzle 7 is effectively reflected.

Therefore, the bonding location 1s for the rubber bush 3 on the stabilizer 1 can be heated more efficiently and effectively, thus reducing energy consumption.

«Third Modification»

Figure 9A:
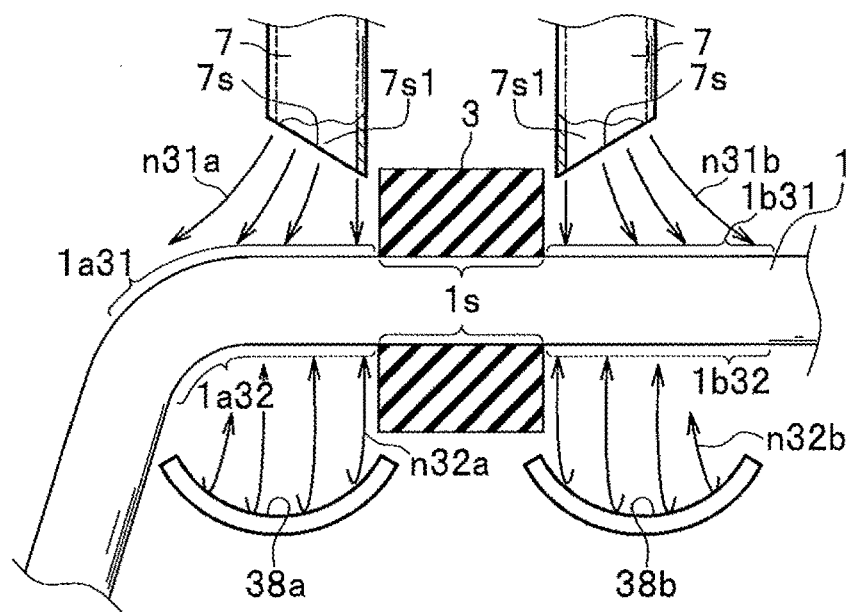
FIG. 9A is a view taken in the direction of arrow A in FIG. 2, showing a state of the bonding being carried out by hot air blown out through nozzles in a third modification.
Figure 9B:
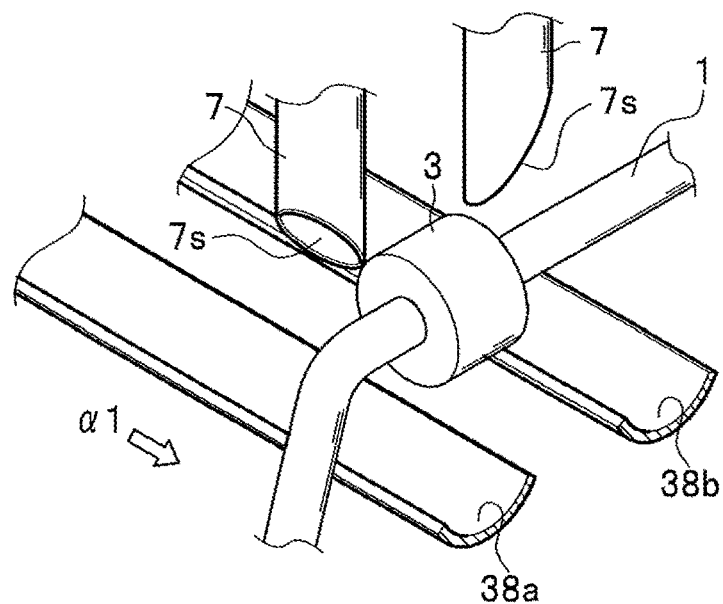
FIG. 9B is a perspective view including partial cross-section, showing the state of the bonding being carried out by hot air blown out through the nozzles in the third modification.

FIG. 9A describes a view taken in the direction of arrow A in FIG. 2, showing a state of the bonding being carried out by hot air blown out through nozzles in a third modification, and FIG. 9B describes a perspective view including partial cross-section, showing the state of the bonding being carried out by hot air blown out through the nozzles in the third modification.

The third modification replaces the reflective plate 28 having the two concave shapes 28a, 28b in the second modification, with separated reflective plates 38a, 38b.

The other configuration is the same as the configuration of the embodiment, and thus the same component is shown with the same reference sign given and detailed description thereof is omitted.

The separated reflective plates 38a, 38b in the third modification are formed, in order to allow the hot air blown out through the nozzles 7 to be reflected without loss on the locations (neighboring regions 1a32, 1b32) in the vicinity of the bonding location 1s for the rubber bush 3 on the stabilizer 1, into two concave shapes with a curvature such that the vicinity (neighboring regions 1a32, 1b32) of the bonding location 1s of the stabilizer 1 is surrounded inside.

In other words, the reflective plate 38a has the concave shape which is concave to the neighboring region 1a32 in the vicinity of the bonding location 1s of the stabilizer 1. Similarly, the reflective plate 38b has the concave shape which is concave to the neighboring region 1b32 in the vicinity of the bonding location 1s of the stabilizer 1.

The reflective plates 38a, 38b have the concave shapes each extending along the direction in which the stabilizers 1 are placed on the conveyor belt 4 (the direction in which the front and back side of the space in FIG. 9A is penetrated through) (see FIG. 9B).

This allows hot air n31a blown out through one nozzle 7 to hit one neighboring region 1a31 in the vicinity of the rubber bush 3 on the stabilizer 1 and heat the region. Then, the hot air n31a passing through the stabilizer 1 is reflected on the reflective plate 38a having the concave shape to be hot air n32a, which in turn hits one neighboring region 1a32 on the side opposite to the one nozzle 7 in the vicinity of the rubber bush 3 on the stabilizer 1 and heats the region. This makes it possible to heat the bonding location 1s through the thermal conduction by the stabilizer 1.

In the same way, hot air n31b blown out through the other nozzle 7 hit the other neighboring region 1b31 in the vicinity of the rubber bush 3 on the stabilizer 1 and heat the region. Then, the hot air n31b passing through the stabilizer 1 is reflected on the reflective plate 38b having the concave shape to be hot air n32b, which in turn hits the other neighboring region 1b32 on the side opposite to the other nozzle 7 in the vicinity of the rubber bush 3 on the stabilizer 1 and heats the region. This makes it possible to heat the bonding location 1s through the thermal conduction by the stabilizer 1.

Note that, as long as each of the reflective plates 38a, 38b is adapted to allow the hot air n31a, n31b blown out through the respective nozzles 7 to be reflected thereon, and allow the reflected hot air n32a, n32b to hit the neighboring regions 1a32, 1b32 on the side opposite to the nozzles 7 in the vicinity of the rubber bush 3 on the stabilizer 1, the reflective plates 38a, 38b may be disposed separately for locations facing the nozzles 7, or maybe formed into a continuous shape for the locations facing the nozzles 7. Note that FIG. 9B illustrates the case in which each of the reflective plates 38a, 38b is formed into a continuous shape for the locations facing the nozzles 7.

The third modification allows the two reflective plates 38a, 38b each having the concave shape to be provided. Therefore, the hot air n31a, n31b blown out through the nozzles 7 directed to the neighboring regions 1a31, 1b31 in the vicinity of the rubber bush 3 on the stabilizer 1 can be efficiently reflected, and the reflected hot air n32a, n32b hit the neighboring regions 1a32, 1b32 on the side opposite to the nozzles 7 in the vicinity of the rubber bush 3 on the stabilizer 1, thereby making it possible to efficiently and effectively heat the bonding location 1s through the thermal conduction by the stabilizer 1.

In addition, since the two reflective plates 38a, 38b each having the concave shape are separately provided, they can be easily formed into a shape such that the hot air n31a, n31b blown out through each nozzle 7 is effectively reflected.

Also, since the two reflective plates 38a, 38b are provided separately from each other, material for connecting the plates with each other is made unnecessary, thus reducing a material cost.

Therefore, the bonding location 1s for the rubber bush 3 on the stabilizer 1 can be heated efficiently and effectively through the thermal conduction, thus reducing energy consumption.

Accordingly, a further decrease in cost can be achieved.

«Fourth Modification»

Figure 10A:
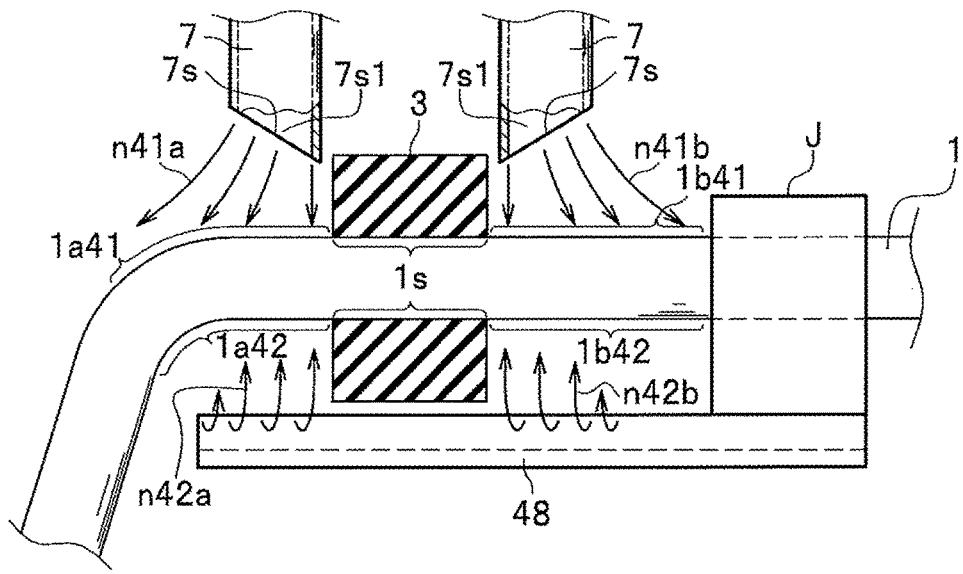
FIG. 10A is a view taken in the direction of arrow A in FIG. 2, showing a state of the bonding being carried out by hot air blown out through nozzles in a fourth modification.
Figure 10B:
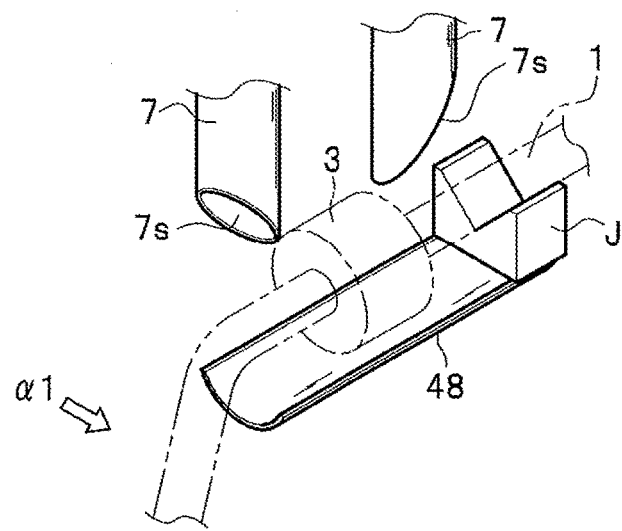
FIG. 10B is a perspective view showing the state of the bonding being carried out by hot air blown out through the nozzles in the fourth modification.

FIG. 10A describes a view taken in the direction of arrow A in FIG. 2, showing a state of the bonding being carried out by hot air blown out through nozzles in a fourth modification, and FIG. 10B describes a perspective view showing the state of the bonding being carried out by hot air blown out through the nozzles in the fourth modification.

The fourth modification replaces the reflective plate in the above embodiment, with a configuration having a reflective plate 48 fixed to a fixing jig J that fixes the stabilizer 1 to the conveyor belt 4 adapted to move in the curing furnace R.

The other configuration is the same as the configuration of the embodiment, and thus the same component is shown with the same reference sign given and detailed description thereof is omitted.

The reflective plate 48 in the fourth modification has a concave shape with a curvature such that it surrounds neighboring regions 1a42, 1b42 in the vicinity of the bonding location 1s for the rubber bush 3 on the stabilizer 1.

In other words, the reflective plate 48 has the concave shape which is concave to the neighboring regions 1a42, 1b42 in the vicinity of the bonding location 1s for the rubber bush 3 on the stabilizer 1.

Moreover, the reflective plate 48 is configured to be fixed to the fixing jig J used for attaching the stabilizer 1 to the conveyor belt 4.

The reflective plate 48 is adapted to reflect thereon hot air n41a blown out through the nozzles 7, to be hot air n42a. The hot air n41a heats a neighboring region 1a41 on the stabilizer 1, and the reflected hot air n42a heats the neighboring region 1a42 on the stabilizer 1.

Also, the reflective plate 48 is adapted to reflect thereon hot air n41b blown out through the nozzles 7, to be hot air n42b. The hot air n41b heats a neighboring region 1b41 on the stabilizer 1, and the reflected hot air n42b heats the neighboring region 1b42 on the stabilizer 1.

Note that a reflective plate (not shown) located on the other side of the stabilizer 1 is also configured to be fixed to the fixing jig J in the same manner as the reflective plate 48.

The fourth modification allows the reflective plate 48 that is adapted to reflect thereon the hot air n41a, n41b blown out through the respective nozzles 7, to be fixed to the fixing jig J, thus making it possible to simplify an attachment structure of the reflective plate 48 and achieve a decrease in cost.

Moreover, the reflective plate 48 that reflects thereon the hot air n41a, n41b blown out through the nozzles 7 is fixed to the fixing jig J for the stabilizer 1 to be moved together with the stabilizer 1.

Therefore, the reflective plate 48 need not be provided for each of the nozzles 7 that are disposed along the line in the curing furnace R, thus allowing the size of the reflective plate 48 to be reduced to the minimum necessary.

Accordingly, material for the reflective plate 48 needs only the smallest volume, thus making it possible to reduce a material cost and achieve a decrease in cost.

«Fifth Modification»

Figure 11:
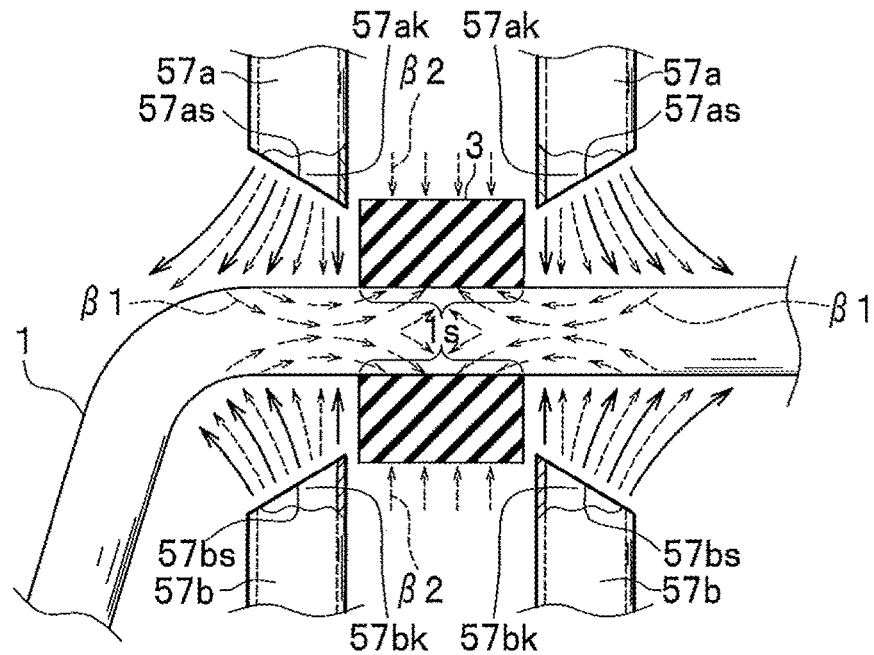
FIG. 11 is a view taken in the direction of arrow A in FIG. 2, showing a state of the bonding being carried out by hot air blown out through nozzles in a fifth modification.

FIG. 11 describes a view taken in the direction of arrow A in FIG. 2, showing a state of the bonding being carried out by hot air blown out through nozzles in a fifth modification.

The fifth modification replaces the nozzles 7 in the above embodiment, with nozzles 57a, 57a disposed on the upper side and nozzles 57b, 57b disposed on the lower side.

The other configuration is the same as the configuration of the embodiment, and thus the same component is shown with the same reference sign given and detailed description thereof is omitted.

The fifth modification allows a pair of nozzles 57a, 57a to be disposed above the location on the stabilizer 1 in the vicinity of the rubber bush 3 that is press-contacted with the stabilizer 1, and allows a pair of nozzles 57b, 57b to be disposed below the location.

The stabilizer 1 and the rubber bush 3 press-contacted with the stabilizer 1 are fixed to the conveyor belt 4 to move on the line in the curing furnace R.

Heads 57as, 57as of the nozzles 57a, 57a each have a slant formed to be away from the stabilizer 1, toward the side distant from the rubber bush 3. Similarly, heads 57bs, 57bs of the nozzles 57b, 57b each have a slant formed to be away from the stabilizer 1, toward the side distant from the rubber bush 3.

Moreover, the heads 57as, 57as of the nozzles 57a, 57a have openings 57ak, 57ak that are disposed to face the locations in the vicinity of the rubber bush 3 that is press-contacted with the stabilizer 1. Similarly, the heads 57bs, 57bs of the nozzles 57b, 57b have openings 57bk, 57bk that are disposed to face the locations in the vicinity of the rubber bush 3 that is press-contacted with the stabilizer 1.

The fifth modification allows the nozzles 57a, 57a to be disposed above the location on the stabilizer 1 in the vicinity of the rubber bush 3 that is press-contacted with the stabilizer 1, and allows the nozzles 57b, 57b to be disposed below the location, thus making it possible to allow more hot air to be blown against the location in the vicinity of the bonding location 1s for the rubber bush 3 on the stabilizer 1. Therefore, a larger amount of heat can be given to the bonding location 1s for the rubber bush 3 on the stabilizer 1, allowing heating of the bonding location 1s to be effectively carried out.

Moreover, since the nozzles 57b, 57b are disposed below the location in the vicinity of the rubber bush 3 that is press-contacted with the stabilizer 1, the hot air blown out through the nozzles 57b, 57b can be blown against desired locations.

«Sixth Modification»

Figure 12:
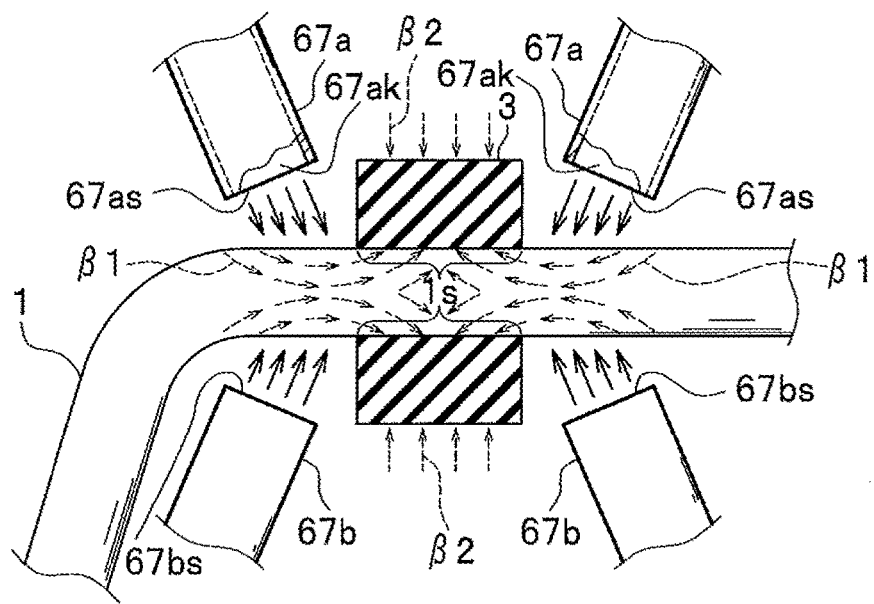
FIG. 12 is a view taken in the direction of arrow A in FIG. 2, showing a state of the bonding being carried out by hot air blown out through nozzles in a sixth modification.
Figure 13:
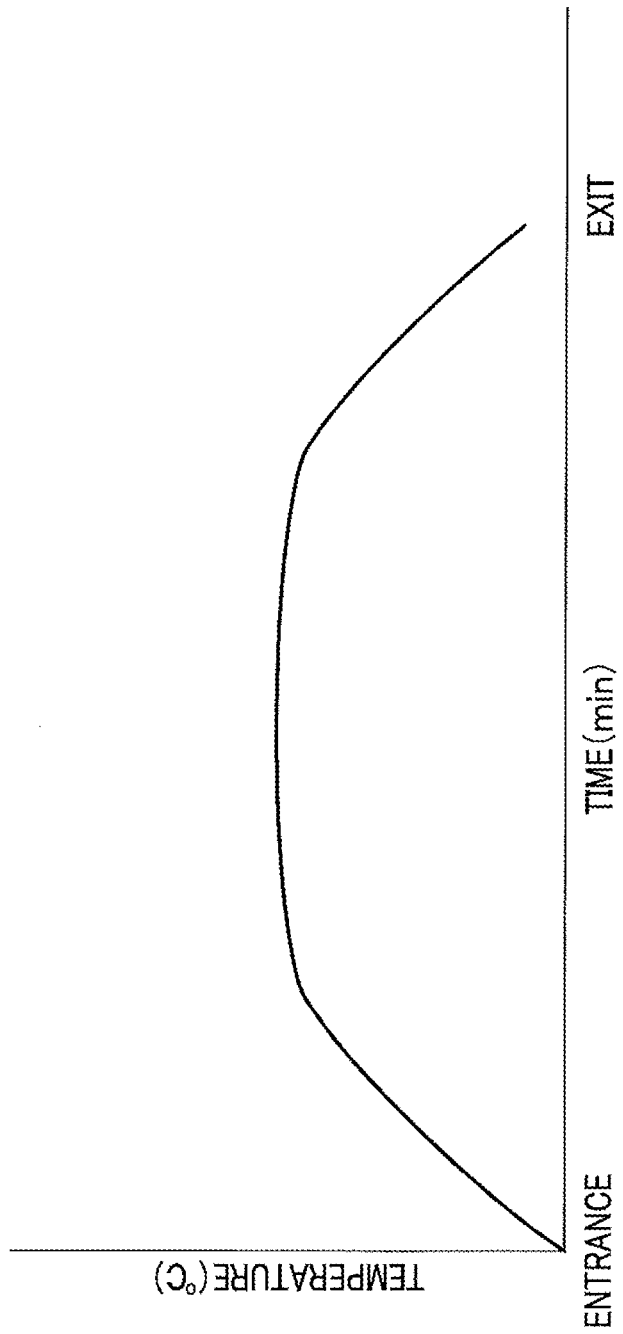
FIG. 13 is a graph representing transition of a temperature in a furnace in a situation of bonding of a rubber bush to a stabilizer bar in a conventional art.

FIG. 12 describes a view taken in the direction of arrow A in FIG. 2, showing a state of the bonding being carried out by hot air blown out through nozzles in a sixth modification.

The sixth modification replaces the nozzles 57a, 57b in the fifth modification, with nozzles 67a, 67b having heads 67as, 67bs not slanted.

The other configuration is the same as the configuration of the embodiment, and thus the same component is shown with the same reference sign given and detailed description thereof is omitted.

The sixth modification allows a pair of nozzles 67a, 67a to be disposed above the location in the vicinity of the rubber bush 3 that is press-contacted with the stabilizer 1, and allows a pair of nozzles 67b, 67b to be disposed below the location.

The stabilizer 1 and the rubber bush 3 press-contacted with the stabilizer 1 are fixed to the conveyor belt 4 to move on the line in the curing furnace R.

The heads 67as, 67as, 67bs, 67bs of the nozzles 67a, 67a, 67b, 67b each have no slant, unlike the embodiment and the first to fifth modifications described above.

Moreover, the heads 67as, 67as of the nozzles 67a, 67a on the upper side have openings 67ak, 67ak that are disposed to face the locations on the stabilizer 1 in the vicinity of the bonding location 1s for the rubber bush 3 that is press-contacted with the stabilizer 1. Similarly, the heads 67bs, 67bs of the nozzles 67b, 67b have openings 67bk, 67bk that are disposed to face the locations on the stabilizer 1 in the vicinity of the bonding location 1s for the rubber bush 3 that is press-contacted with the stabilizer 1.

The sixth modification allows the nozzles 67a, 67a to be disposed above the location in the vicinity of the rubber bush 3 that is press-contacted with the stabilizer 1, and allows the nozzles 67b, 67b to be disposed below the location, thus making it possible to allow more hot air to be blown against the location in the vicinity of the bonding location 1s for the rubber bush 3 on the stabilizer 1. Therefore, a larger amount of heat can be given to the bonding location 1s for the rubber bush 3 on the stabilizer 1.

Moreover, since the nozzles 67b, 67b are disposed below the location in the vicinity of the bonding location 1s for the rubber bush 3 that is press-contacted with the stabilizer 1, the hot air blown out through the nozzles 67b, 67b can be blown against desired locations.

In addition, since the heads 67as, 67as, 67bs, 67bs of the nozzles 67a, 67a, 67b, 67b have no slant, production of the nozzles 67a, 67a, 67b, 67b can be facilitated to increase productivity and thus a decrease in cost can be achieved.

«Other Embodiments»

1. Although, in the above embodiment and the above modifications, the reflective plate of a plate material has been illustrated as the reflective member, the reflective member may be composed of a member in the form of a block other than the plate material as long as it can reflect hot air, and shapes thereof can be arbitrarily selected.
2. The configuration of the above sixth modification, in which the heads 67as, 67as, 67bs, 67bs of the nozzles 67a, 67a, 67b, 67b have no slant, may be applied in the configurations of the above embodiment and the above first to fifth modifications.
3. A configuration maybe adopted which is obtained by suitably selecting from among and combining together the configurations of the above embodiment and the above first to sixth modifications.

Note that the present invention is not limited to the above embodiment and the above first to sixth modifications, and may include various embodiments. For example, the above embodiment has been described for a better understanding of the present invention, and is not necessarily limited to what includes all of the described configurations. For example, an embodiment such that some of the described configurations are included may be adopted.

REFERENCE SIGNS LIST

1: Stabilizer
1a1: Neighboring region (Location in the vicinity of a rubber bush bonding location)
1a21, 1a22, 1b21, 1b22: Neighboring region (Location in the vicinity of a rubber bush bonding location)
1a31, 1a32, 1b31, 1b32: Neighboring region (Location in the vicinity of a rubber bush bonding location)
1a41, 1a42, 1b41, 1b42: Neighboring region (Location in the vicinity of a rubber bush bonding location)
1s: Bonding location (Rubber bush bonding location)
3: Rubber bush
4: Conveyor belt (Manufacturing line conveying unit)
5: Hot air generating device (Heat source device)
7, 57a, 57b, 67a, 67b: Nozzle
7s, 57as, 57bs: Head
8, 18, 28, 38a, 38b, 48: Reflective plate (Reflective member)
f1, f2, f3: Fan (Blower device)
J: Fixing jig
R: Curing furnace
S: Stabilizer manufacturing apparatus

The invention claimed is:

1. A stabilizer manufacturing apparatus that is adapted to bond a rubber bush which is a bush made of rubber interposed between a vehicle body and a stabilizer that suppresses a rolling phenomenon of a vehicle, to a rubber bush bonding location where an adhesive layer of the stabilizer is formed, the apparatus comprising:
a curing furnace for heating the stabilizer that is conveyed by a manufacturing line conveying unit and has the rubber bush bonding location with which the rubber bush is press-contacted, to perform the bonding;
a heat source device that heats air;
a blower device that sends the air heated by the heat source device as hot air; and
a plurality of nozzles that are disposed along the manufacturing line conveying unit in the curing furnace and adapted to blow the hot air at a near position from and against a location in the vicinity of the rubber bush bonding location of the stabilizer,
wherein the nozzles each have a head that has a slant formed to be away from the stabilizer, from a side close to the rubber bush toward a side distant from the rubber bush, in a situation of the hot air being blown against the location.

2. The stabilizer manufacturing apparatus according to claim 1, wherein the nozzles each have an opening that is disposed to face the stabilizer close to the rubber bush, in a situation of the hot air being blown out through the opening of each nozzle.

3. The stabilizer manufacturing apparatus according to claim 1, further comprising a reflective member that is disposed at a position on the opposite side of the nozzles to face the location in the vicinity of the rubber bush bonding location of the stabilizer, and reflects the hot air blown out through the nozzles to blow the hot air against the location close to the rubber bush on the stabilizer.

4. The stabilizer manufacturing apparatus according to claim 3, wherein the reflective member has a concave shape which is concave to the location in the vicinity of the rubber bush bonding location of the stabilizer.

5. The stabilizer manufacturing apparatus according to claim 3, further comprising a fixing jig that fixes the stabilizer to the manufacturing line conveying unit, wherein the reflective member is attached to the fixing jig.

6. The stabilizer manufacturing apparatus according to claim 1, wherein the stabilizer with which the rubber bush is press-contacted is conveyed by the manufacturing line conveying unit from an entrance to an exit of the curing furnace, and air volume of hot air blown out through the nozzles disposed on the entrance side of the curing furnace is set to be more than air volume of hot air blown out through the nozzles disposed on the exit side.

7. The stabilizer manufacturing apparatus according to claim 1, wherein a temperature at which the heat source device heats air is set to be a constant temperature.

8. A stabilizer manufacturing method that includes bonding a rubber bush which is a bush made of rubber interposed between a vehicle body and a stabilizer that suppresses a rolling phenomenon of a vehicle, to a rubber bush bonding location where an adhesive layer of the stabilizer is formed, the method comprising:
   heating air by means of a heat source device;
   sending, by means of a blower device, heated air as hot air to a plurality of nozzles that are disposed along a manufacturing line conveying unit;
   conveying in a curing furnace, by means of the manufacturing line conveying unit, the stabilizer having the rubber bush bonding location with which the rubber bush is press-contacted; and
   blowing, by means of the nozzles, the hot air at a near position from and against a location in the vicinity of the rubber bush bonding location of the stabilizer, wherein the nozzles each have a head that has a slant formed to be away from the stabilizer, from a side close to the rubber bush toward a side distant from the rubber bush, in a situation of the hot air being blown against the location.

9. The stabilizer manufacturing method according to claim 8, wherein the nozzles each have an opening that is disposed to face the stabilizer close to the rubber bush, in a situation of the hot air being blown out through the opening of each nozzle.

10. The stabilizer manufacturing method according to claim 8, further comprising reflecting, by means of a reflective member, the hot air blown out through the nozzles to blow the hot air against the location close to the rubber bush on the stabilizer.

11. The stabilizer manufacturing method according to claim 10, wherein the reflective member is attached to a fixing jig that fixes the stabilizer to the manufacturing line conveying unit.

12. The stabilizer manufacturing method according to claim 8, wherein air volume of hot air blown out through the nozzles disposed on the entrance side of the curing furnace is set to be more than air volume of hot air blown out through the nozzles disposed on the exit side.

* * * * *